(12) United States Patent
Harada et al.

(10) Patent No.: US 7,511,775 B2
(45) Date of Patent: *Mar. 31, 2009

(54) OPTICAL ADDRESS TYPE SPATIAL LIGHT MODULATOR

(75) Inventors: Haruo Harada, Ebina (JP); Hiroshi Arisawa, Ebina (JP); Hideo Kobayashi, Ebina (JP); Takeo Kakinuma, Ebina (JP); Minoru Koshimizu, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/653,838

(22) Filed: Jan. 17, 2007

(65) Prior Publication Data

US 2007/0115398 A1 May 24, 2007

Related U.S. Application Data

(62) Division of application No. 10/143,016, filed on May 13, 2002, now Pat. No. 7,190,417.

(30) Foreign Application Priority Data

Nov. 1, 2001 (JP) .............................. 2001-336786

(51) Int. Cl.
- *G02F 1/13* (2006.01)
- *G02F 1/135* (2006.01)
- *G02F 1/1347* (2006.01)

(52) U.S. Cl. ................. 349/25; 349/2; 349/29; 349/74; 345/50; 345/87; 359/294

(58) Field of Classification Search ............... 349/2, 349/25, 29, 74; 345/50, 87; 359/294
See application file for complete search history.

(56) References Cited

U.S. PATENT DOCUMENTS 4,012,251 A    3/1977   Turner (Continued)

FOREIGN PATENT DOCUMENTS

JP        355023169    *  2/1980

(Continued)

OTHER PUBLICATIONS

"Liquid Crystal Device Hand Book" edited by Japan Society for the Promotion of Science 142 Commission (The Japan Industrial Journal, Sep. 29, 1989), p. 633-634 (w/partial translation).

(Continued)

*Primary Examiner*—David Nelms
*Assistant Examiner*—Hoan C Nguyen
(74) *Attorney, Agent, or Firm*—Oliff & Berridge, PLC

(57) ABSTRACT

An optical address type spatial light modulator has a plurality of optical address type light modulation layers stacked on each other, each having a liquid crystal layer for reflecting visible light in a specific wavelength band or a liquid crystal layer for absorbing visible light in a specific wavelength band and coloring and a photoconductive layer for absorbing the visible light in the specific wavelength band and changing the resistance value in response to the light intensity of the visible light absorbed, the liquid crystal layer and the photoconductive layer being stacked on each other between electrodes.

5 Claims, 9 Drawing Sheets

U.S. PATENT DOCUMENTS

| | | | |
|---|---|---|---|
| 4,018,509 A | | 4/1977 | Boswell et al. |
| 5,142,391 A | | 8/1992 | Fujiwara et al. |
| 5,153,759 A | | 10/1992 | Haas et al. |
| 5,245,453 A | | 9/1993 | Hatano et al. |
| 5,329,390 A | * | 7/1994 | Fujiwara et al. ............... 349/27 |
| 5,486,936 A | | 1/1996 | Fujikake et al. |
| 5,892,561 A | | 4/1999 | Suzuki et al. |
| 6,163,348 A | * | 12/2000 | Izumi et al. ................. 348/761 |
| 6,338,883 B1 | | 1/2002 | Iwamatsu et al. |
| 6,437,848 B1 | * | 8/2002 | Okada et al. ................ 349/156 |
| 6,570,709 B2 | | 5/2003 | Katayama et al. |
| 7,116,309 B1 | * | 10/2006 | Kimura et al. .............. 345/105 |

FOREIGN PATENT DOCUMENTS

| | | |
|---|---|---|
| JP | A-6-118439 | 4/1994 |

OTHER PUBLICATIONS

"Color Liquid Crystal Display" written and edited by Shunsuke Kobayashi et al. (Industry Books, Dec. 14, 1990), p. 94-95 and 228-229 (w/partial translation).

* cited by examiner

OPTICAL ADDRESS TYPE SPATIAL LIGHT MODULATOR

This is a Division of application Ser. No. 10/143,016 filed May 13, 2002. The disclosure of the prior application is hereby incorporated by reference herein in its entirety.

BACKGROUND

This invention relates to an optical address type spatial light modulator.

Application of an optical address type spatial light modulator to an optical amplification element for projection type display, an optical computation element for optical computing, or a display element with the optical address type spatial light modulator itself as a medium, etc., is examined.

FIG. 1 is a drawing to show an example of an optical address type spatial light modulator and its write section previously used.

An optical address type spatial light modulator 1 in FIG. 1 is made up of a pair of substrates 17 and 18 formed on inner faces with electrodes 19 and 20 and a liquid crystal layer 21 for reflecting incident read light 29, a photoconductive layer 22 with impedance changing depending on incident write light 28, and a light separation layer 23 being placed between the liquid crystal layer 21 and the photoconductive layer 22 for preventing leakage of the read light 29 to the side of the photoconductive layer 22 and leakage of the write light 28 to the side of the liquid crystal layer 21, the layers 21, 22, and 23 being sandwiched between the substrates 17 and 18. As the liquid crystal layer 21, any of various liquid crystal elements different in optical effect, such as a technique of using polarization state change of homeotropic-aligned nematic liquid crystal, homogeneous-aligned nematic liquid crystal, twisted nematic liquid crystal, supertwisted nematic liquid crystal, surface stabilized ferroelectric liquid crystal, etc., a technique of using light scattering state change of polymer dispersed liquid crystal, etc., a technique of using light absorption state change of guest host liquid crystal, etc., or a technique of using optical interference state change of cholesteric (chiral nematic) liquid crystal, etc., can be used. As the photoconductive layer 22, an element having an internal photoelectric effect produced by the write light 28, such as an inorganic photoconductive film of a-Si:H, CdS, etc., or an organic photoconductive film provided by combining a charge generation layer consisting of azo pigment, phthalocyanine pigment, etc., and a charge transport layer consisting of hydrazone, aryl amine, etc., is used. As the light separation layer 23, a dielectric mirror comprising substances different in refractive index such as $TiO_2$ and $SiO_2$ deposited alternately for interference-reflecting the write light 28 is used and a light absorption layer is provided for absorbing the write light 28 between the dielectric mirror and the photoconductive layer 22 as required when the write light 28 is strong, etc. In the technique of using optical interference state change, only the light absorption layer is used as the light separation layer 23.

A write section 2 comprises a voltage application section 24 with a power supply 27 connected to the electrodes 19 and 20 of the optical address type spatial light modulator 1 for applying a predetermined voltage, a light application section 26 for applying the write light 28 to the photoconductive layer 22, and a control section 25 for controlling the timings, etc., of applying the voltage from the voltage application section 24 and applying the write light from the light application section 26.

FIG. 2 is an equivalent circuit diagram of the optical address type spatial light modulator.

In FIG. 2, the optical address type spatial light modulator is represented as a circuit wherein the liquid crystal layer 21, the photoconductive layer 22, or the light separation layer 23 that can be replaced as a parallel circuit of a resistor and a capacitance and the electrode 19, 20 that can be replaced as a resistor are connected in series, and bias voltage V applied between the electrodes 19 and 20 from the write section 2 is divided by the impedance of each circuit. When the write light is applied from the light application section 26 to the photoconductive layer 22, a resistance value $R_4$ of the photoconductive layer 22 lowers and thus division voltage $V_2$ applied to the portion of the liquid crystal layer 21 to which the write light is applied becomes higher than the portion to which the write light is not applied. Therefore, the voltage distribution of the liquid crystal layer 21 changes with the light intensity of the write light and the optical state of the liquid crystal layer 21 also changes in response to the voltage distribution, so that the light intensity distribution of the write light can be reflected on the reflectivity distribution of the read light.

The optical address type spatial light modulator 1 previously used, shown in FIG. 1 can change the reflection strength of the read light 29, but cannot change the wavelength distribution of the read light 29. Therefore, for example, to use the optical address type spatial light modulator 1 as an optical amplification element for projection type display capable of producing color display, dichroic mirrors for reflecting light in response to the wavelength are used.

FIG. 3 is a drawing to show an example of optical address type spatial light modulators using dichroic mirrors.

As shown in FIG. 3, dichroic mirrors 35 and 36 are used to separate incident read light 32 into a plurality of read light beams different in wavelength, for example, R (red) light, G (green) light, and B (blue) light, and mirrors 33 and 34, etc., are used to make the R read light, the G read light, and the B read light incident on separate optical address type spatial light modulators 30A, 30B, and 30C. On the other hand, write light 31 is also separated into R light, G light, and B light by dichroic mirrors 37 and 38 so as to correspond to the R read light, the G read light, and the B read light, and mirrors 39 and 40 are used to apply the R light, the G light, and the B light to the optical address type spatial light modulators. The R read light, the G read light, and the B read light strength-modulated in response to the light intensities of the R write light, the G write light, and the B write light are again combined and are observed as one read light 32. Thus, the optical address type spatial light modulators are provided for changing the wavelength distribution of the read light by using the method of separating the read light 32 and the write light 31 into color light beams different in wavelength. However, the optical address type spatial light modulators thus configured require a complicated optical system and high registration accuracy and thus involve problems of a high apparatus cost and a large apparatus size. Further, separate optical address type spatial light modulators are required in a one-to-one correspondence with the wavelength bands of read light and the incidence and reflection directions of read light are limited and thus it is difficult to use a single optical modulator as a display element for modulating outside light.

It is therefore an object of the invention to provide an optical address type spatial light modulator which makes it possible to change the wavelength distribution of read light according to a simple structure and can also be used as a display element for modulating outside light.

SUMMARY

To the end, according to the invention, according to a first aspect of the invention, there is provided an optical address type spatial light modulator having a plurality of optical address type light modulation layers stacked on each other. Each of optical address type light modulation layers includes a liquid crystal layer for reflecting visible light in a specific wavelength band and a photoconductive layer for absorbing the visible light in the specific wavelength band to change a resistance value thereof in response to the light intensity of the visible light absorbed. Each of liquid crystal layers and each of photoconductive layers are stacked on each other.

According to a second aspect of the invention, there is provided an optical address type spatial light modulator having a plurality of optical address type light modulation layers stacked on each other. Each of optical address type light modulation layers includes a liquid crystal layer for absorbing visible light in a specific wavelength band to color and a photoconductive layer for absorbing the visible light in the specific wavelength band to change a resistance value in response to the light intensity of the visible light absorbed. Each of liquid crystal layers and each of photoconductive layers are stacked on each other.

According to a third aspect of the invention, there is provided a write unit having an optical address type spatial light modulator having a plurality of optical address type light modulation layers stacked on each other and voltage applying unit. Each of optical address type light modulation layers includes a liquid crystal layer for reflecting visible light in a specific wavelength band and a photoconductive layer for absorbing the visible light in the specific wavelength band to change a resistance value thereof in response to the light intensity of the visible light absorbed. Each of liquid crystal layers and each of photoconductive layers are stacked on each other. Each of the plurality of optical address type light modulation layers has electrodes on both sides thereof. The voltage application mean applies voltage to the electrodes of the plurality of optical address type light modulation layers at the same time.

DETAILED DESCRIPTION OF EMBODIMENTS

Referring now to the accompanying drawings, embodiments of optical address type spatial light modulators of the invention will be discussed.

Figure 1:
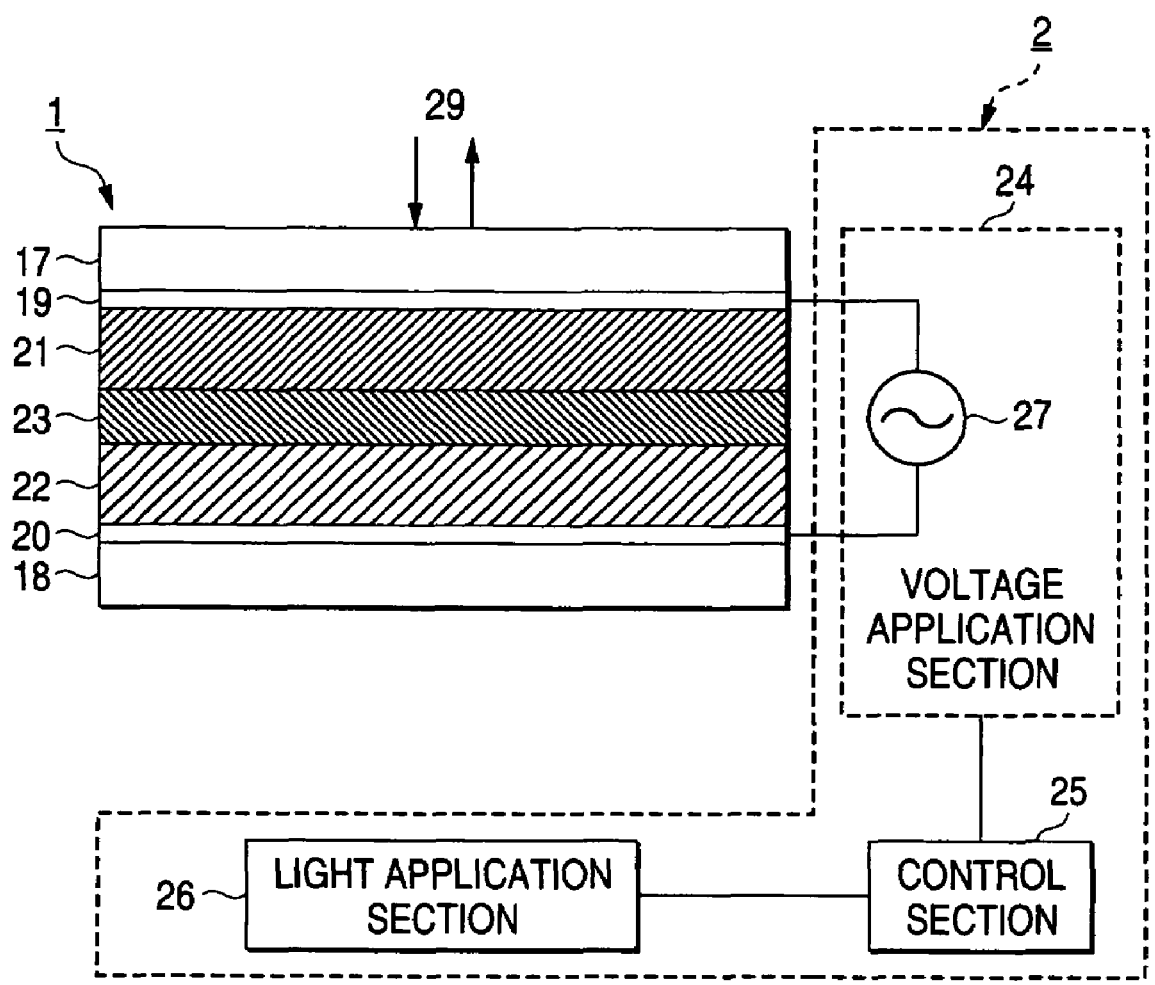
FIG. 1 is a drawing to show an example of an optical address type spatial light modulator and its write section previously used.
Figure 2:
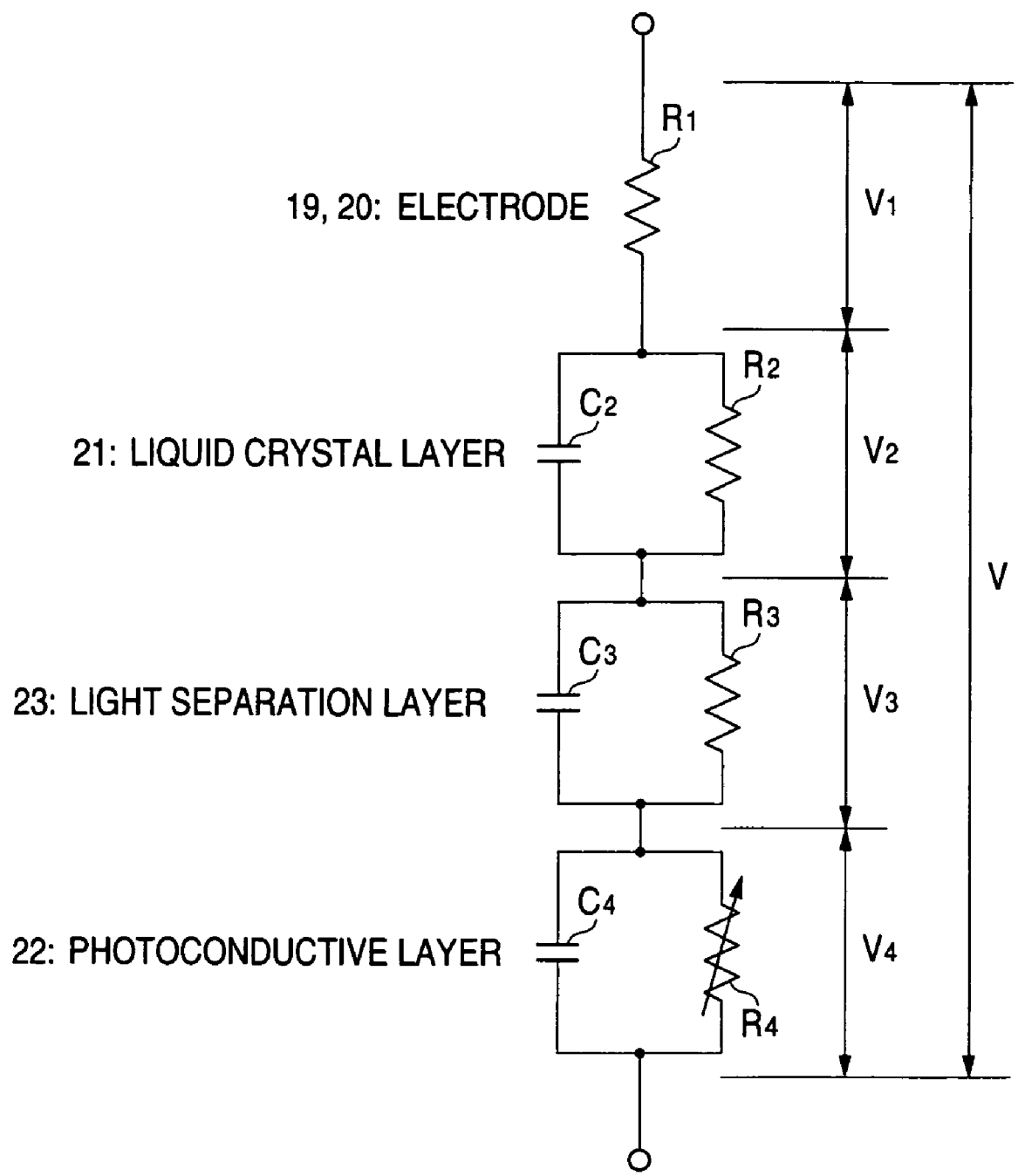
FIG. 2 is an equivalent circuit diagram of the optical address type spatial light modulator.
Figure 3:
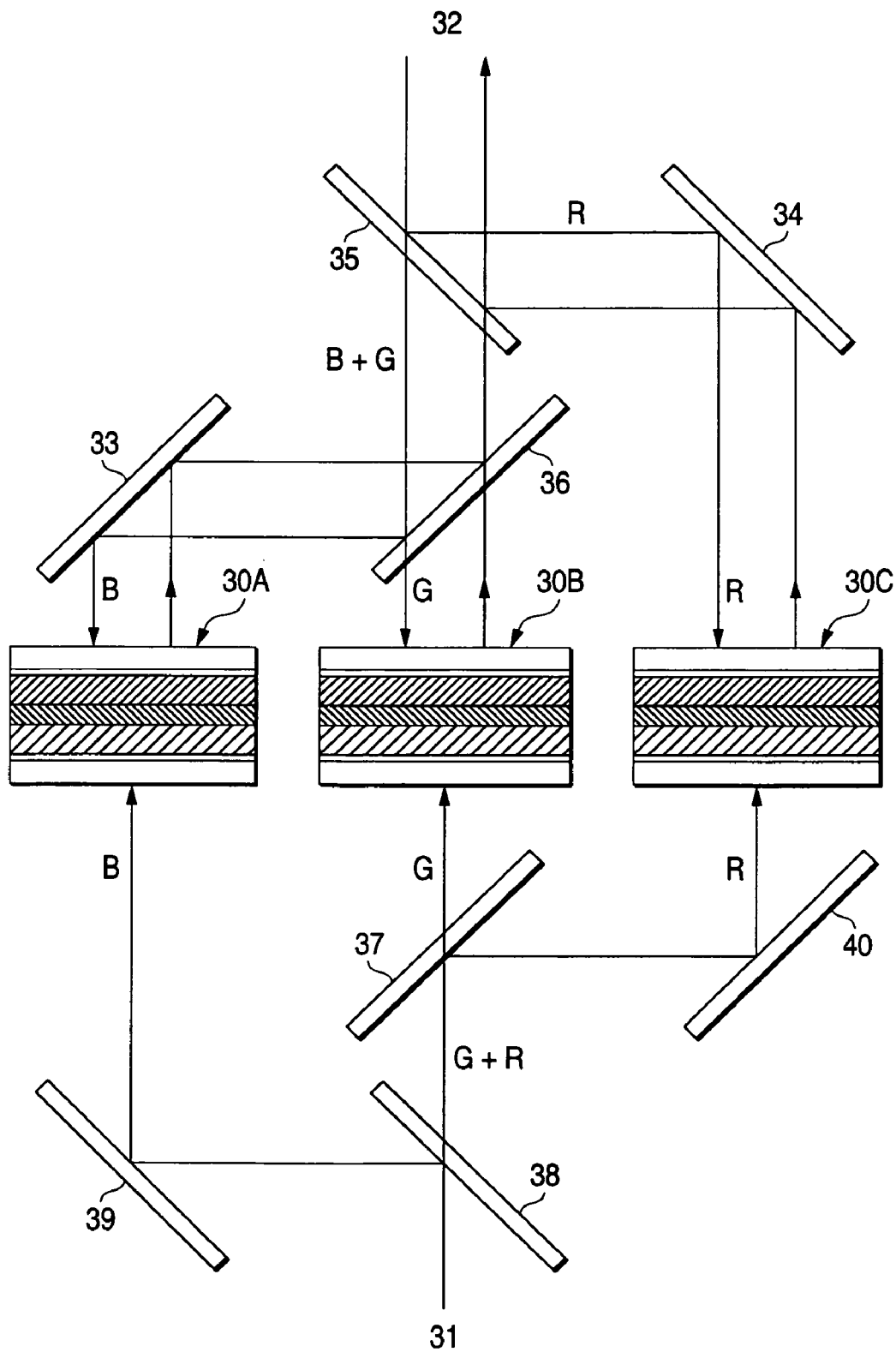
FIG. 3 is a drawing to show an example of optical address type spatial light modulators using dichroic mirrors.
Figure 4:
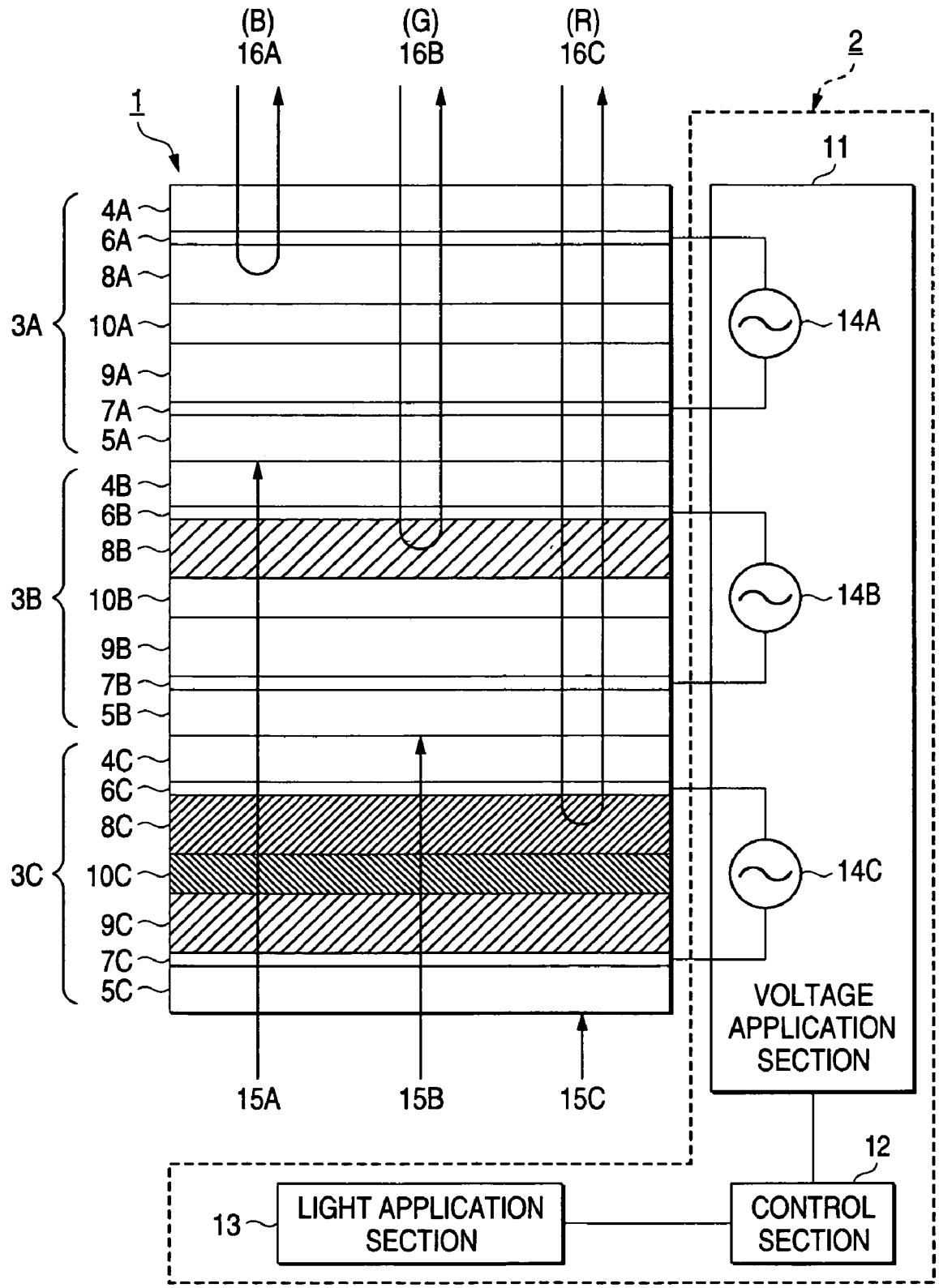
FIG. 4 is a drawing to show an optical address type spatial light modulator of a first embodiment of the invention.

FIG. 4 is a drawing to show an optical address type spatial light modulator of a first embodiment of the invention.

In FIG. 4, an optical address type spatial light modulator 1 has a structure wherein three optical address type light modulation layers 3A, 3B, and 3C for modulating different color light B, G, and R of read light are stacked on each other. The optical address type light modulation layer 3A has a cholesteric (chiral nematic) liquid crystal layer 8A for selectively reflecting B (blue) light, a Y (yellow) light absorption layer 10A for absorbing B light, and a Y photoconductive layer 9A for absorbing B light stacked on each other in order from the surface side on which read light 16 is incident to the back side on which write light 15 is incident, between a substrate 4A formed on an inner face with an electrode 6A and a substrate 5A formed on an inner face with an electrode 7A. The optical address type light modulation layer 3B has a cholesteric (chiral nematic) liquid crystal layer 8B for selectively reflecting G (green) light, an M (magenta) light absorption layer 10B for absorbing G light, and an M photoconductive layer 9B for absorbing G light stacked on each other in order from the surface side to the back side, between a substrate 4B formed on an inner face with an electrode 6B and a substrate 5B formed on an inner face with an electrode 7B. Further, the optical address type light modulation layer 3C also has a cholesteric (chiral nematic) liquid crystal layer 8C for selectively reflecting R (red) light, a C (cyan) light absorption layer 10C for absorbing R light, and a C photoconductive layer 9C for absorbing R light stacked on each other in order from the surface side to the back side, between a substrate 4C formed on an inner face with an electrode 6C and a substrate 5C formed on an inner face with an electrode 7C.

The substrate 4, 5 is formed of glass, silicon, or a polymer film of polyester, polysulfone, polyethersulfone, polycarbonate, etc., and has transparency of read light reflected on the liquid crystal layer 8B, 8C of the optical address type light modulation layer 3B, 3C at least on the back side from the substrate 4, 5 and has transparency of write light absorbed on the photoconductive layer 9A, 9B on the surface side from the substrate 4, 5. A known functional film of a liquid crystal alignment layer, an abrasion resistance layer, a barrier layer for preventing gas mixture, etc., may be formed on the surface as required. The substrates 5A and 4B and the substrates 5B and 4C can also be made common.

The electrode 6, 7 is formed of an ITO film, an NESA film, etc., and has transparency of read light reflected on the liquid crystal layer 8B, 8C of the optical address type light modulation layer 3B, 3C at least on the back side from the substrate 4, 5 and has transparency of write light absorbed on the photoconductive layer 9B, 9C on the surface side from the electrode 6, 7.

The liquid crystal layer 8 can control the reflectivity or absorption factor of light in a specific wavelength band and is formed of cholesteric (chiral nematic) liquid crystal for reflecting visible light in a specific wavelength band.

The photoconductive layer 9 is formed of an inorganic photoconductor of a-Si:H, a-Se, Te—Se, $As_2Se_3$, CdSe, CdS, etc., or an organic photoconductor provided by combining charge generation material of azo pigment, phthalocyanine pigment, perylene pigment, quinacridone pigment, piroropyrrol pigment, indigo pigment, etc., and charge transport material of aryl amine, hydrazone, triphenyl methane, PVK, etc.

To use an optical modulator for controlling the reflection state of the read light 16 such as cholesteric (chiral nematic) liquid crystal as the liquid crystal layer 8, the light absorption layer 10 is formed of a light absorption film made of a pigment, a dye, etc., absorbing light in a specific wavelength band.

The optical address type spatial light modulator 1 is connected to the write section 2, whereby write and read are made possible.

The write section 2 is made up of a voltage application section 11 for applying bias voltages 14A, 14B, and 14C between the electrodes 6A and 7A of the optical address type light modulation layer 3A, between the electrodes 6B and 7B of the optical address type light modulation layer 3B, and between the electrodes 6C and 7C of the optical address type light modulation layer 3C, a light application section 13 for applying modulated write light 15 to the optical address type spatial light modulator 1, and a control section 12 for controlling the voltage application section 11 and the light application section 13. The optical address type spatial light modulator 1 and the write section 2 can be detachably connected by a connector, etc., for example.

In the embodiment, as for visible light in specific wavelength bands, B light, G light, and R light are arranged in order from the surface side to the back side. However, the arrangement need not necessarily be limited to the above-mentioned arrangement and the visible light in specific wavelength bands need not necessarily be limited to B light, C light, and R light either and may be Y light, M light, and C light different in wavelength band, for example.

FIG. 5A to 5D are schematic drawings to show a state in which color light beams having different wavelength bands are written into the optical address type spatial light modulation layers and read therefrom.

Figure 5A:
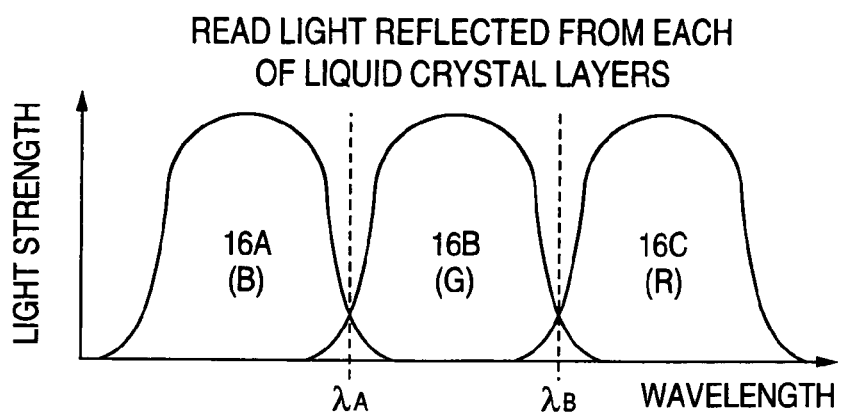
FIG. 5A to 5D are schematic drawings to show a state in which color light beams having different wavelength bands are written into optical address type spatial light modulation layers and read therefrom.
Figure 5B:
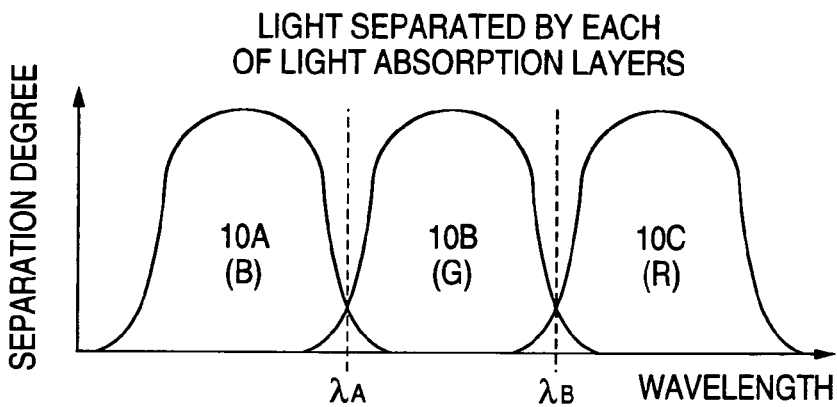
Figure 5C:
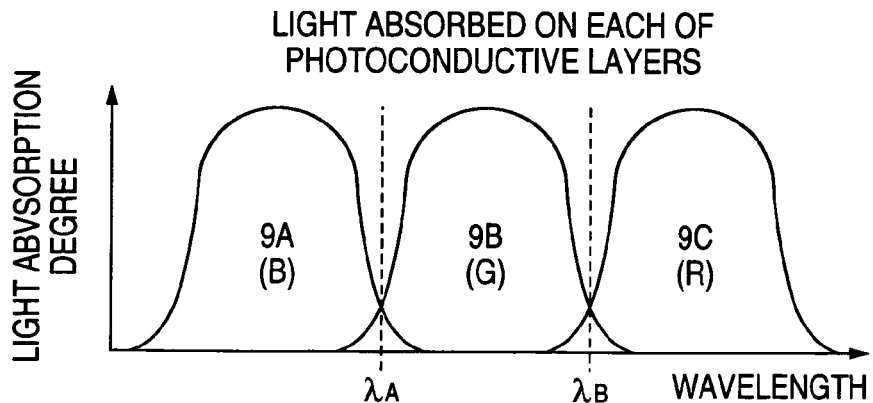
Figure 5D:
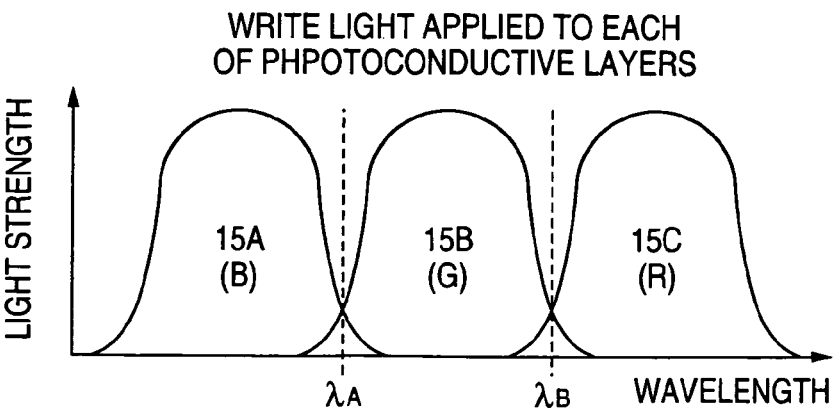

FIG. 5D represents the spectral distribution of write light applied to the photoconductive layers, FIG. 5C represents the wavelength bands of write light absorbed on the photoconductive layers, FIG. 5B represents the wavelength bands of read light absorbed on the light absorption layers, and FIG. 5A represents the wavelength bands of read light reflected by the liquid crystal layers. The horizontal axis indicates wavelength (λ) and the vertical axis indicates the light strength of the read light 16 reflected from the liquid crystal layers in the optical address type spatial light modulator 1 of the embodiment, the separation degree of visible light provided by the light absorption layers 10, the light absorption degree of visible light absorbed on the photoconductive layers 9, and the light strength of the write light 15 applied to the photoconductive layers 9 in the order of FIG. 5A to FIG. 5D.

In FIG. 5D, write light that can be disassembled in color into B (blue) write light 15A, G (green) write light 15B, and R (red) write light 15C is applied to the optical address type spatial light modulator 1. In FIG. 5C, when the photoconductive layer 9C absorbs R light, the resistance value lowers, but the photoconductive layer 9C allows G light and B light to pass through and thus the resistance value does not change with G light or B light. When the photoconductive layer 9B absorbs G light, the resistance value lowers, but the photoconductive layer 9B allows B light and R light to pass through and thus the resistance value does not change with B light or R light. Further, when the photoconductive layer 9A absorbs B light, the resistance value lowers, but the photoconductive layer 9A allows R light and G light to pass through and thus the resistance value does not change with R light or G light. In FIG. 5B, the light absorption layer 10C absorbs R light of read light and allows G light and B light to pass through. Therefore, R light of the read light leaked from reflection on the liquid crystal layer 8C is absorbed on the light absorption layer 10C and thus does not reach the photoconductive layer 9C. The light absorption layer 10B absorbs G light of read light and allows B light and R light to pass through. Therefore, G light of the read light leaked from reflection on the liquid crystal layer 8B is absorbed on the light absorption layer 10B and thus does not reach the photoconductive layer 9B. Further, the light absorption layer 10A absorbs B light of read light and allows R light and G light to pass through. Therefore, B light of the read light leaked from reflection on the liquid crystal layer 8A is absorbed on the light absorption layer 10A and thus does not reach the photoconductive layer 9A. In FIG. 5A, as the resistance value of each photoconductive layer lowers, the division voltage applied to each liquid crystal layer increases and the reflectivity relative to the wavelength band of the color light absorbed on each photoconductive layer rises. That is, the R light of the read light passes through the optical address type spatial light modulation layers 3A and 3B and is reflected on the liquid crystal layer 8C where the reflectivity of the wavelength band of the R light rises, of the optical address type spatial light modulation layer 3C and again passes through the optical address type spatial light modulation layers 3A and 3B and is observed. The G light of the read light passes through the optical address type spatial light modulation layer 3A and is reflected on the liquid crystal layer 8B where the reflectivity of the wavelength band of the G light rises because of G write light, of the optical address type spatial light modulation layer 3B and again passes through the optical address type spatial light modulation layer 3A and is observed. Further, the B light of the read light is reflected on the liquid crystal layer 8A where the reflectivity of the wavelength band of the B light rises because of B write light, of the optical address type spatial light modulation layer 3A and is observed.

Thus, the optical address type spatial light modulator 1 of the embodiment is configured as follows. The wavelength band of the color light absorbed on the photoconductive layer 9A, 9B, 9C of the stacked optical address type light modulation layer 3A, 3B, 3C is different from the wavelength band of the color light absorbed on a photoconductive layer further from the write light incidence side than the photoconductive layer. The wavelength band of the color light absorbed on the photoconductive layer 9A, 9B, 9C of the stacked optical address type light modulation layer 3A, 3B, 3C is different from the wavelength band of the color of the read light reflected on the liquid crystal layer of the optical address type light modulation layer further from the read light incidence side than the photoconductive layer. The wavelength band of the color light separated by the light absorption layer 10A, 10B, 10C of the stacked optical address type light modulation layer 3A, 3B, 3C is different from the wavelength band of the color light absorbed on the photoconductive layer further from the write light incidence side than the photoconductive layer. The wavelength band of the color light separated by the light absorption layer 10A, 10B, 10C of the stacked optical address type light modulation layer 3A, 3B, 3C is different from the wavelength band of the read light reflected from the optical address type light modulation layer further from the read light incidence side than the photoconductive layer.

Accordingly, the write light 15A is made incident on the photoconductive layer 9A of the optical address type light modulation layer 3A without being absorbed on the optical address type light modulation layer 3B or 3C and is absorbed on the photoconductive layer 9A and the light absorption layer 10A, thereby preventing light from being leaked to the side of the liquid crystal layer 8A. The write light 15B is made incident on the photoconductive layer 9B of the optical address type light modulation layer 3B without being absorbed on the optical address type light modulation layer 3C and is absorbed on the photoconductive layer 9B and the light absorption layer 10B, thereby preventing light from being leaked to the side of the liquid crystal layer 8B. Further, the write light 15C is made incident on the photoconductive layer 9C of the optical address type light modulation layer 3C and is absorbed on the photoconductive layer 9C and the light absorption layer 10C, thereby preventing light from being leaked to the side of the liquid crystal layer 8C.

On the other hand, the read light 16C is made incident on the liquid crystal layer 8C of the optical address type light modulation layer 3C without being absorbed on the optical address type light modulation layer 3A or 3B and light leakage to the side of the photoconductive layer 9A is prevented by the light absorption layer 10C. The read light 16B is made incident on the liquid crystal layer 8B of the optical address type light modulation layer 3B without being absorbed on the optical address type light modulation layer 3A and light leakage to the side of the photoconductive layer 9B is prevented by the light absorption layer 10B. The read light 16A is made incident on the liquid crystal layer 8A of the optical address type light modulation layer 3A and light leakage to the side of the photoconductive layer 9C is prevented by the light absorption layer 10A.

Thus, even with the structure wherein a plurality of optical address type light modulation layers are stacked on each other, it is made possible to separately control the optical state of each optical address type light modulation layer without considering the mutual interference between the write light for operating each optical address type light modulation layer and the read light modulated on each optical address type light modulation layer.

Therefore, without using a complicated optical system for separating the wavelengths of write light and read light, the optical address type spatial light modulator of the simple integral structure capable of changing the wavelength distribution of read light is configured, for example, so that each of the stacked optical address type light modulation layers reflects a part of visible light, whereby projection display capable of producing color display, a display unit using the optical address type spatial light modulator itself as a display medium, etc., can be provided.

FIGS. 6 to 9 are schematic drawings to show examples of driving methods of the optical address type spatial light modulator of the invention.

In each drawing, the upper three stages represent the timings and light intensities of the write light 15A, the write light 15B, and the write light 15C applied to the optical address type spatial light modulation layers 3A, 3B, and 3C, and the lower three stages represent the timings and magnitudes of the AC bias voltages 14A, 14B, and 14C applied to the optical address type spatial light modulation layers 3A, 3B, and 3C.

To drive the optical address type spatial light modulator, the voltage application section 11 of the write section 2 shown in FIG. 4 applies the bias voltages 14A, 14B, and 14C considering the operation threshold voltages of the liquid crystal layers 8A, 8B, and 8C and the light application section 13 applies the write light 15A, the write light 15B, and the write light 15C of the light intensities considering the light sensitivities of the photoconductive layers 9A, 9B, and 9C for changing the optical state of each liquid crystal layer, thereby changing the reflection state of each of the read light 16A, the read light 16B, and the read light 16C. The control section 12 adjusts the applying timings of the bias voltages 14A, 14B, and 14C and the applying timings of the write light 15A, the write light 15B, and the write light 15C so that the combinations of the bias voltages and the write light intensities required for the optical address type light modulation layers 3A, 3B, and 3C to operate, 14A and 15A, 14B, and 15B, and 14C and 15C, overlap at least in a part.

Figure 6:
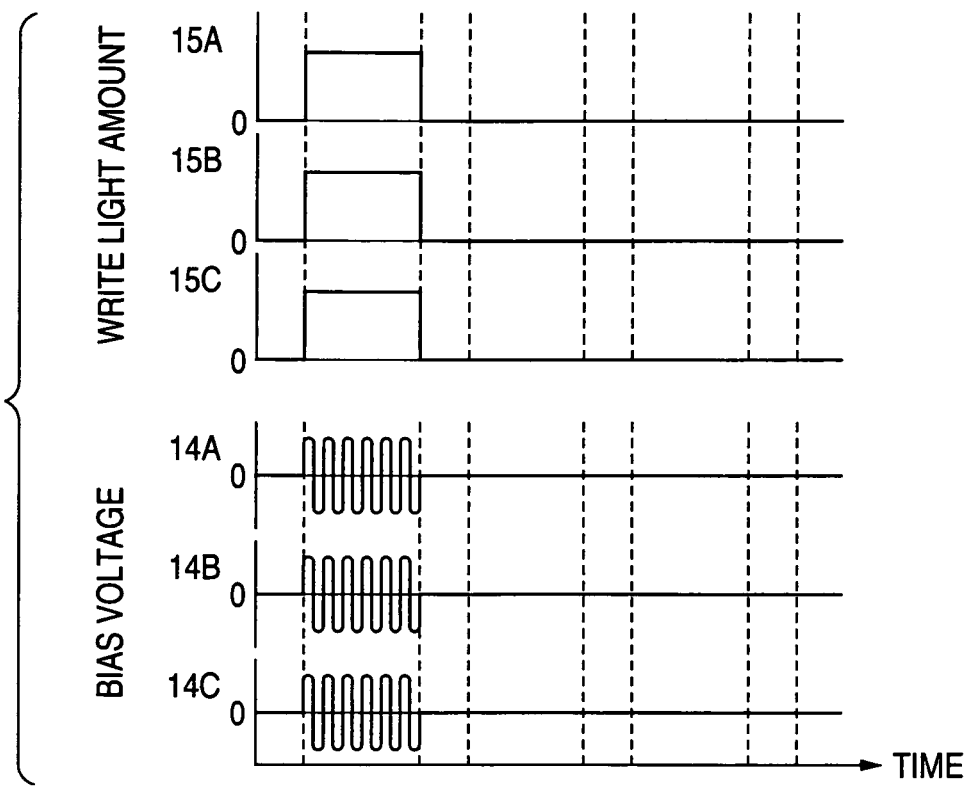
FIG. 6 is a schematic drawing to show an example of a driving method of the optical address type spatial light modulator of the invention.

FIG. 6 shows the method of driving all optical address type light modulation layers at the same time.

In the driving method, an image supported by the write light for each color is written into the liquid crystal layers 8A, 8B, and 8C by the R write light, G write light, and B write light applied at the same time or the R write light, G write light, and B write light applied separately and the bias voltages applied at the same time as the write light to the optical address type light modulation layers 3A, 3B, and 3C.

Figure 7:
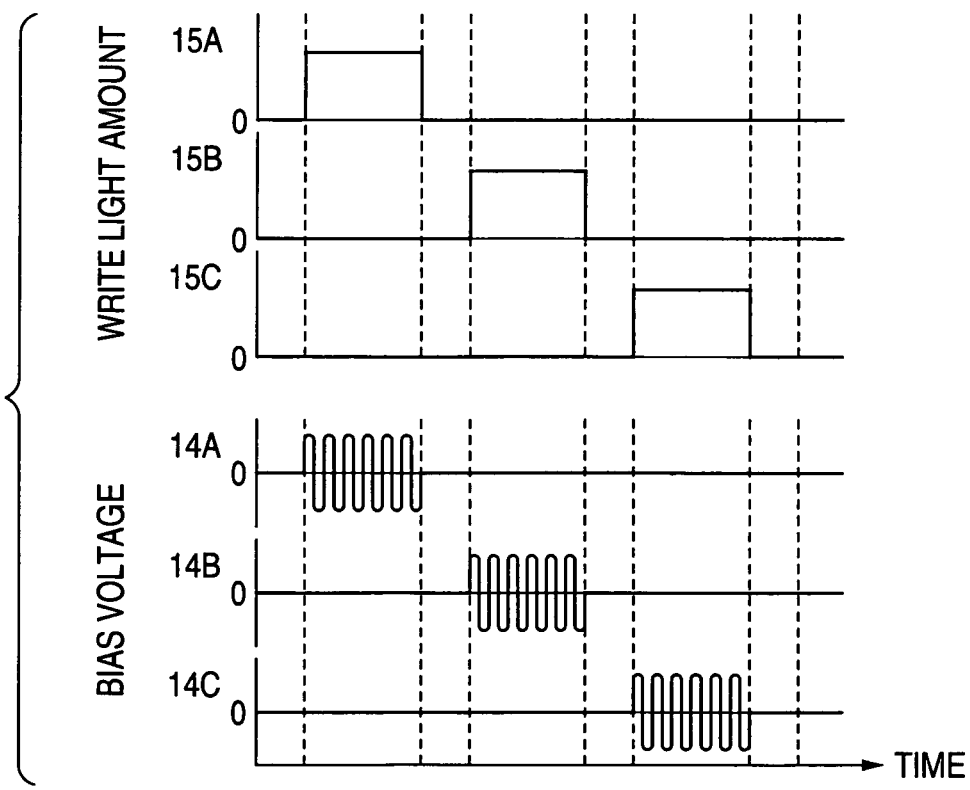
FIG. 7 is a schematic drawing to show an example of a driving method of the optical address type spatial light modulator of the invention.
Figure 8:
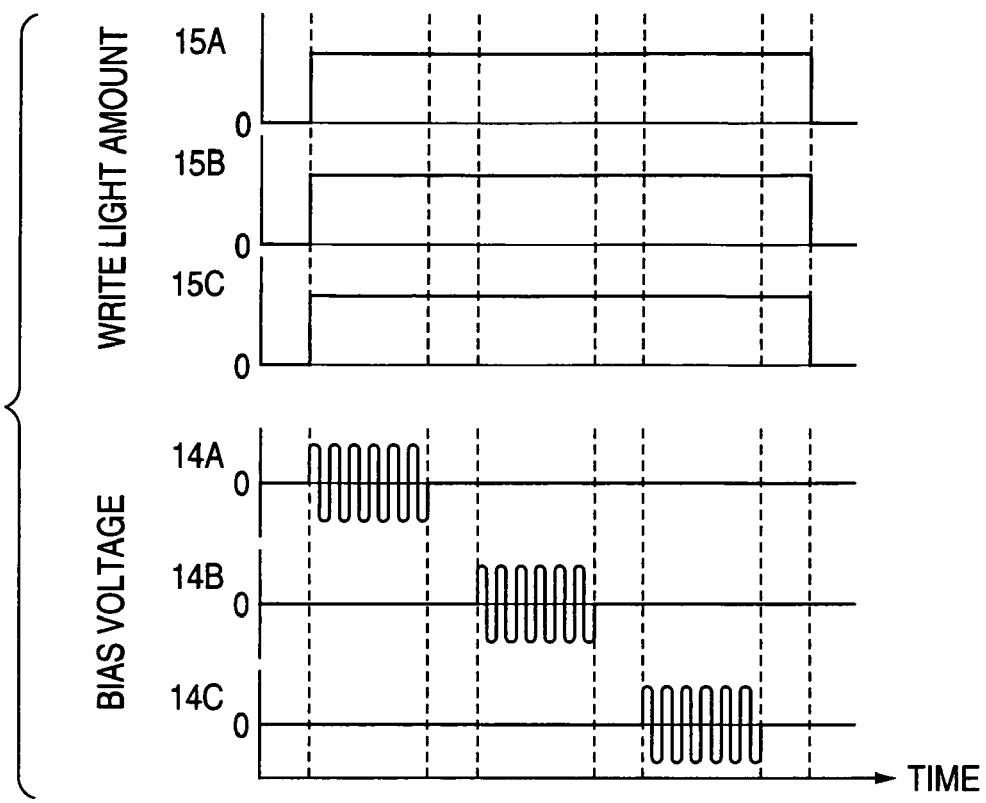
FIG. 8 is a schematic drawing to show an example of a driving method of the optical address type spatial light modulator of the invention.
Figure 9:
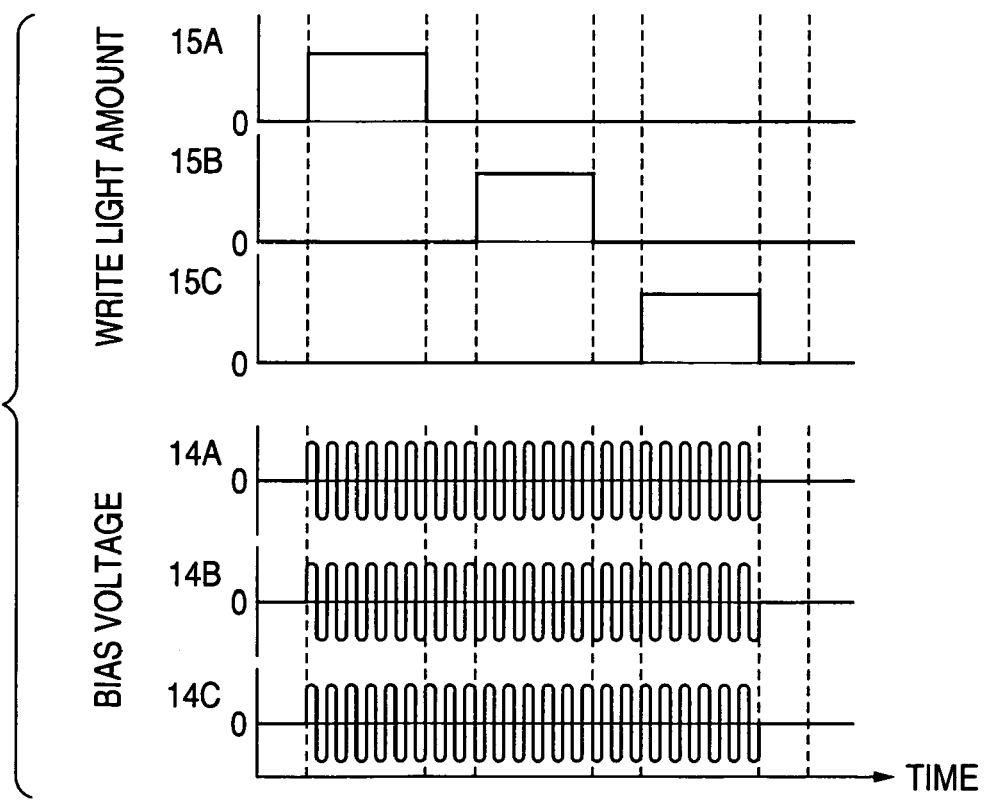
FIG. 9 is a schematic drawing to show an example of a driving method of the optical address type spatial light modulator of the invention.

FIGS. 7, 8, and 9 show the driving methods of the optical address type light modulation layers in a time division manner.

In each driving method, either or both of the applied voltage and the applied write light to each of the optical address type light modulation layers 3A, 3B, and 3C are applied in a time division manner, and B, G, and R images are written into the liquid crystal layers 8A, 8B, and 8C at the timings at which the voltages are applied and the B write light, G write light, and R write light are applied. FIG. 7 shows the driving method of applying both of the voltage and the write light in a time division manner. FIG. 8 shows the driving method of applying the B write light, G write light, and R write light to the optical address type light modulation layers 3A, 3B, and 3C all together and applying the voltages in a time division manner. In contrast, FIG. 9 shows the driving method of applying the voltages to the optical address type light modulation layers 3A, 3B, and 3C all together and applying the B write light, G write light, and R write light in a time division manner.

Next, a second embodiment of an optical address type spatial light modulator of the invention will be discussed. The second embodiment differs from the first embodiment in that the light absorption layers of the optical address type light modulation layers are omitted, that cholesteric (chiral nematic) liquid crystal having a memory property for reflecting visible light in a specific wavelength band is used as liquid crystal layers, and that write light and read light are applied from the direction at different timings, and therefore only the differences will be discussed.

Figure 10:
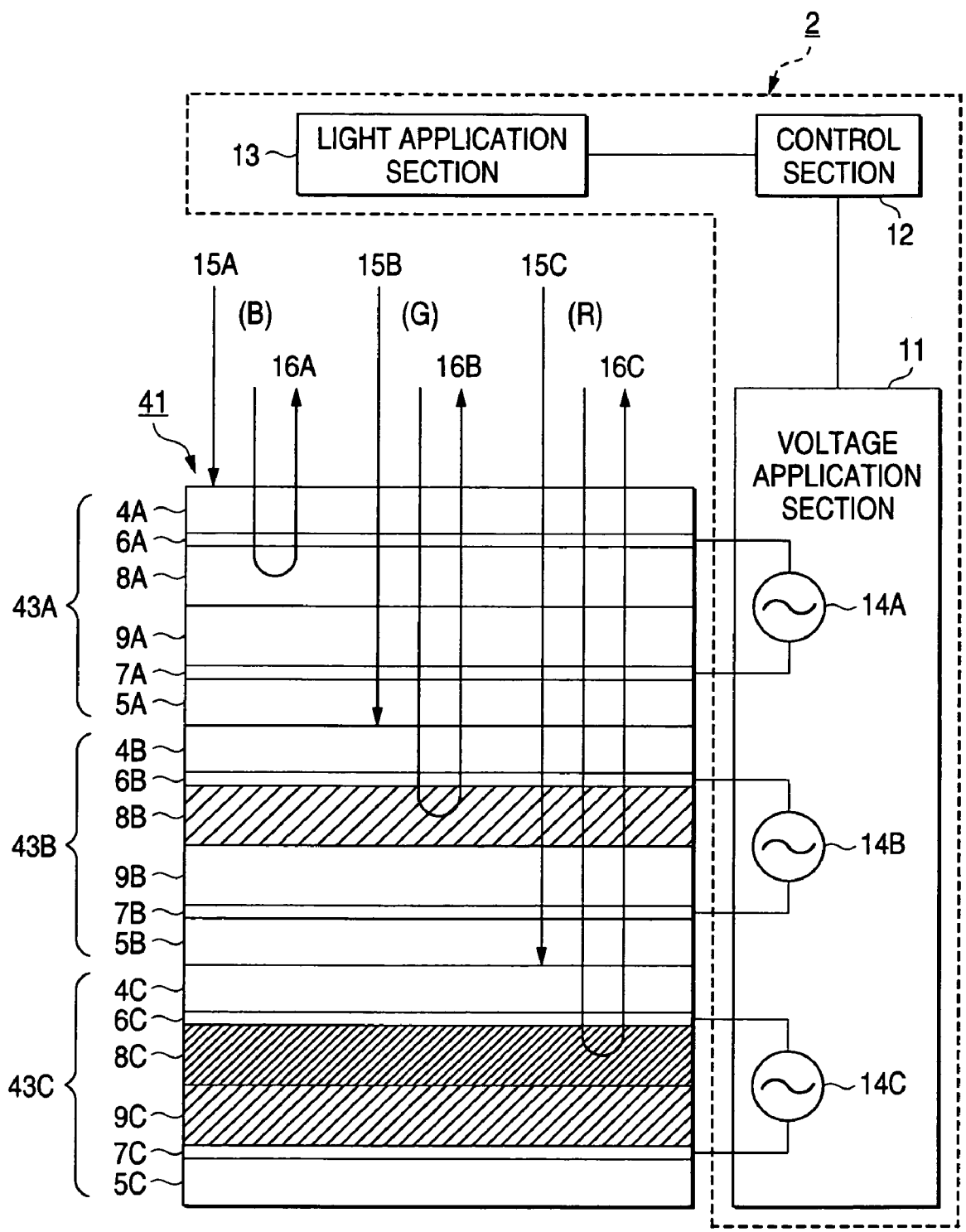
FIG. 10 is a drawing to show an optical address type spatial light modulator of a second embodiment of the invention.

FIG. 10 is a drawing to show an optical address type spatial light modulator of the second embodiment of the invention.

An optical address type spatial light modulator 41 of the embodiment has the same components as those in the first embodiment previously described with reference to FIG. 4 except that it does not comprise the light absorption layer 10A, 10B, or 10C. Therefore, components identical with those previously described with reference to FIG. 4 are denoted by the same reference numeral in FIG. 10 and only the differences will be discussed.

In the optical address type spatial light modulator 41 shown in FIG. 10, write light 15A, write light 15B, and write light 15C supporting images are incident from the surface side.

Photoconductive layers 9A, 9B, and 9C of optical address type light modulation layers 43A, 43B, and 43C absorb visible light in different wavelength bands and allow visible light in wavelength bands except the wavelength bands of the visible light absorbed to pass through. When the photoconductive layer 9C absorbs R light, the resistance value lowers, but the photoconductive layer 9C allows G light and B light to pass through and thus the resistance value does not change with G light or B light. When the photoconductive layer 9B absorbs G light, the resistance value lowers, but the photoconductive layer 9B allows B light and R light to pass through and thus the resistance value does not change with B light or R light. Further, when the photoconductive layer 9A absorbs B light, the resistance value lowers, but the photoconductive layer 9A allows R light and G light to pass through and thus the resistance value does not change with R light or G light. As the resistance value of each photoconductive layer 9A, 9B, 9C lowers, the division voltage applied to each liquid crystal layer 8A, 8B, 8C increases and the reflectivity relative to the wavelength band of the color light absorbed on each photoconductive layer 9A, 9B, 9C rises. That is, the R light of the read light passes through the optical address type spatial light modulation layers 43A and 43B and is reflected on the liquid crystal layer 8C where the reflectivity of the wavelength band of the R light rises, of the optical address type spatial light modulation layer 43C and again passes through the optical address type spatial light modulation layers 43A and 43B. The G light of the read light passes through the optical address type spatial light modulation layer 43A and is reflected on the liquid crystal layer 8B where the reflectivity of the wavelength band of the G light rises because of G write light, of the optical address type spatial light modulation layer 43B and again passes through the optical address type spatial light modulation layer 43A. Further, the B light of the read light is reflected on the liquid crystal layer 8A where the reflectivity of the wavelength band of the B light rises because of B write light, of the optical address type spatial light modulation layer 43A.

With the optical address type spatial light modulator 41, the write light 15A, write light 15B, and write light 15C supporting images are made incident from the surface side for writing the images, and at the timing after the images are written, read light 16A, read light 16B, and read light 16C for image read are made incident from the surface side for reading the images on the surface side.

In the embodiment, no light absorption layers are provided, but the write and read timings are made different, so that if the read light leaked from reflection on each liquid crystal layer reaches the corresponding photoconductive layer, no effect is produced.

Next, a third embodiment of an optical address type spatial light modulator of the invention will be discussed. The third embodiment differs from the first embodiment in that a liquid crystal layer of each optical address type light modulation layer is of guest host type wherein coloring occurs upon absorption of light in a specific wavelength band and that a reflection layer for reflecting light in the same wavelength band as the wavelength band of light absorbed on the photoconductive layer is placed between the liquid crystal layer and the photoconductive layer. However, a write section for writing information, etc., into the optical address type spatial light modulator is identical with that in the fist embodiment and therefore the optical address type spatial light modulator, which is different from the first embodiment, will be discussed.

Figure 11:
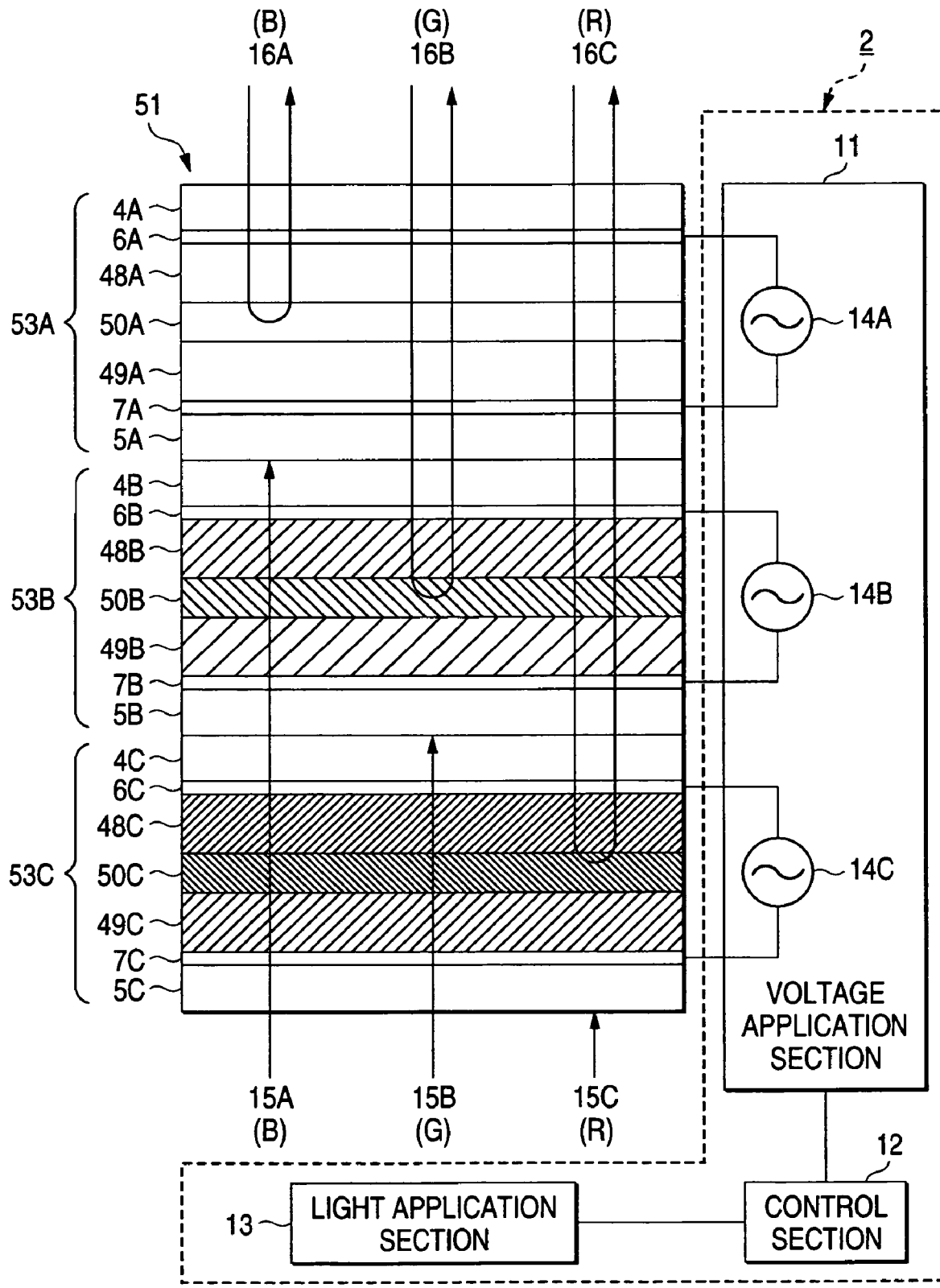
FIG. 11 is a drawing to show an optical address type spatial light modulator of a third embodiment of the invention.

FIG. 11 is a drawing to show the optical address type spatial light modulator of the third embodiment of the invention. The optical address type spatial light modulator of the third embodiment differs from that of the first embodiment previously described with reference to FIG. 4 only in liquid crystal layers and light reflection layers. Therefore, components identical with those previously described with reference to FIG. 4 are denoted by the same reference numeral in FIG. 11 and will not be discussed again.

In FIG. 11, optical address type spatial light modulator 51 has a structure wherein three optical address type light modulation layers 53A, 53B, and 53C for modulating different color light R, G, and B of read light are stacked on each other. The optical address type light modulation layer 53A comprises a liquid crystal layer 48A for absorbing B (blue) light and coloring to Y (yellow), a light reflection layer 50A for reflecting B light, and a photoconductive layer 49A for absorbing B light stacked on each other in order from the surface side on which read light 16 is incident to the back side on which write light 15 is incident, between a substrate 4A formed on an inner face with an electrode 6A and a substrate 5A formed on an inner face with an electrode 7A. The optical address type light modulation layer 53B has a liquid crystal layer 48B for absorbing G (green) light and coloring to M (magenta), a light reflection layer 50B for reflecting G light, and a photoconductive layer 49B for absorbing G light stacked on each other in order from the surface side to the back side, between a substrate 4B formed on an inner face with an electrode 6B and a substrate 5B formed on an inner face with an electrode 7B. Further, the optical address type light modulation layer 53C has a liquid crystal layer 48C for absorbing R (red) light and coloring to C (cyan), a light reflection layer 50C for reflecting R light, and a photoconductive layer 49C for absorbing R light stacked on each other in order from the surface side to the back side, between a substrate 4C formed on an inner face with an electrode 6C and a substrate 5C formed on an inner face with an electrode 7C.

As the liquid crystal layer 48, guest host liquid crystal including dichromatic die (guest) having anisotropy in absorption of visible light in the major axis direction and the minor axis direction of molecules dissolved in liquid crystal (host) in given molecular orientation is used. When no voltage is applied, light absorption of the dye occurs and coloring occurs; when a voltage is applied, light absorption does not occur and coloring does not occur. The opposite effect can also be produced depending on the used liquid crystal and dye.

ECB liquid crystal, etc., is used as the liquid crystal layer 48 and the birefringence of the liquid crystal is controlled, whereby the transmittance state of the incident read light 16 can also be controlled.

As the light reflection layer 50, a light reflection film for reflecting light in a specific wavelength band such as a cholesteric (chiral nematic) liquid crystal film or a dielectric mirror comprising substances different in refractive index such as $TiO_2$ and $SiO_2$ or ZnS and $MgF_2$ deposited alternately is used. When the write light is strong, etc., a light absorption film made of pigment, dye, etc., for absorbing light in a specific wavelength band may be provided on the back side of the dielectric mirror as required.

When write light 15A, write light 15B, and write light 15C that can be disassembled into B (blue), G (green), and R (red) is applied to the optical address type spatial light modulator 51, the photoconductive layer 49C absorbs R light and the resistance value lowers because of the R light, but the photoconductive layer 49C allows G light and B light to pass through and thus the resistance value does not change with G light or B light. The photoconductive layer 49B absorbs G light and the resistance value lowers because of the G light, but the photoconductive layer 49B allows B light and R light to pass through and thus the resistance value does not change with B light or R light. Further, the photoconductive layer 49A absorbs B light and the resistance value lowers because of the B light, but the photoconductive layer 49A allows R light and G light to pass through and thus the resistance value does not change with R light or G light.

When no voltage is applied, the liquid crystal layer 48C absorbs R light; when a voltage is applied, the liquid crystal layer 48C allows R light to pass through. When no voltage is applied, the liquid crystal layer 48B absorbs G light; when a voltage is applied, the liquid crystal layer 48B allows G light to pass through. Further, when no voltage is applied, the liquid crystal layer 48A absorbs B light; when a voltage is applied, the liquid crystal layer 48A allows B light to pass through.

The light reflection layer 50C reflects R light of read light and allows G light and B light to pass through. The light reflection layer 50B reflects G light of read light and allows B light and R light to pass through. Further, the light reflection layer 50A reflects B light of read light and allows R light and G light to pass through.

That is, the R light of the read light passes through the optical address type spatial light modulation layers 53A and 53B and passes through the liquid crystal layer 48C of the optical address type spatial light modulation layer 53C and is reflected on the light reflection layer 50C and is observed on the surface side. The G light of the read light passes through the optical address type spatial light modulation layer 53A and passes through the liquid crystal layer 48B of the optical address type spatial light modulation layer 53B and is reflected on the light reflection layer 50B and is observed on the surface side. Further, the B light of the read light passes through the liquid crystal layer 48A of the optical address type spatial light modulation layer 53A and is reflected on the light reflection layer 50A and is observed on the surface side.

Thus, the optical address type spatial light modulator 51 of the embodiment is configured as follows. The wavelength band of the color light absorbed on the photoconductive layer 49A, 49B, 49C of the stacked optical address type light modulation layer 53A, 53B, 53C is different from the wavelength band of the color light absorbed on a photoconductive layer further from the write light incidence side than the photoconductive layer. The wavelength band of the color light absorbed on the photoconductive layer 49A, 49B, 49C of the stacked optical address type light modulation layer 53A, 53B, 53C is different from the wavelength band of the read light absorbed on the liquid crystal layer of the optical address type light modulation layer further from the read light incidence side than the photoconductive layer. The wavelength band of the light reflected by the light reflection layer 50A, 50B, 50C of the stacked optical address type light modulation layer 53A, 53B, 53C is different from the wavelength band of the light absorbed on the photoconductive layer further from the write light incidence side than the photoconductive layer. The wavelength band of the light reflected by the light reflection layer 50A, 50B, 50C of the stacked optical address type light modulation layer 53A, 53B, 53C is different from the wavelength band of the light reflected from the light reflection layer of the optical address type light modulation layer further from the read light incidence side than the photoconductive layer.

Accordingly, the write light 15A is made incident on the photoconductive layer 49A of the optical address type light modulation layer 53A without being absorbed on the optical address type light modulation layer 53B or 53C and is reflected on the light reflection layer 50A and is not leaked to the side of the liquid crystal layer 48A. The write light 15B is made incident on the photoconductive layer 49B of the optical address type light modulation layer 53B without being absorbed on the optical address type light modulation layer 53C and is reflected on the light reflection layer 50B and is not leaked to the side of the liquid crystal layer 48B. Further, the write light 15C is made incident on the photoconductive layer 49C of the optical address type light modulation layer 53C and is reflected on the light reflection layer 50C and is not leaked to the side of the liquid crystal layer 48C.

On the other hand, the read light 16C is made incident on the liquid crystal layer 48C of the optical address type light modulation layer 53C without being absorbed on the optical address type light modulation layer 53A or 53B, passes through the liquid crystal layer 48C, and is reflected by the light reflection layer 50C. The read light 16B is made incident on the liquid crystal layer 48B of the optical address type light modulation layer 53B without being absorbed on the optical address type light modulation layer 53A, passes through the liquid crystal layer 48B, and is reflected by the light reflection layer 50B. Further, the read light 16A is made incident on the liquid crystal layer 48A of the optical address type light modulation layer 53A, passes through the liquid crystal layer 48A, and is reflected by the light reflection layer 50A.

Thus, even with the structure wherein a plurality of optical address type light modulation layers are staked on each other, it is made possible to separately control the optical state of each optical address type light modulation layer without considering the mutual interference between the write light for operating each optical address type light modulation layer and the read light modulated on each optical address type light modulation layer.

In the embodiment, as for light in specific wavelength bands, B light, C light, and R light are arranged in order from the surface side to the back side. However, the arrangement need not necessarily be limited to the above-mentioned arrangement and the light in specific wavelength bands need not necessarily be limited to B light, C light, and R light either and may be Y light, M light, and C light different in wavelength band, for example.

Next, an example of the optical address type spatial light modulator will be discussed.

EXAMPLE

A solution comprising an naphthol AS family bis-azo pigment having high sensitivity to visible light of 600 nm or less dispersed in polyvinyl butyral with tetrahydrofuran as a solvent was applied as a spin coating 200 nm thick onto a glass substrate 0.7 mm thick with an ITO transparent electrode sputtered (7059: Corning Incorporated) and a solution comprising N,N'-bis(3-methylphenyl)-1,1'-biphenyl-4,4'-diamine dispersed in bisphenol Z polycarbonate with monochlorobenzene as a solvent was applied as a spin coating 3 μm thick onto the substrate, thereby forming a photoconductive layer. Next, a water solution comprising dye having high absorption of visible light of 600 nm or less (CF Red226: Manufactured by Mitsui Chemicals, Inc) dispersed in polyvinyl alcohol was applied as a spin coating 1 μm thick, thereby forming a light absorption layer. Next, the substrate was superposed on a glass substrate 0.7 mm thick with an ITO transparent electrode sputtered (7059: Corning Incorporated) via a 5-μm spherical spacer (Micropearl SP-205: Manufactured by Sekisui Chemical Co., Ltd.), providing an empty cell. A mixture solution of chiral nematic liquid crystal (E48, CB15, R1011: Manufactured by Merck KGaA) with the helical pitch adjusted so that the reflection peak wavelength becomes 510 nm and ultraviolet cure resin (NOA65: Manufactured by Norland) was capillary-poured into the gap of the empty cell in a heat state to isotropic phase and 50-mW UV light was applied for 30 seconds for forming an light modulation layer of a PSCT structure, thereby providing a first optical address type light modulation layer. A solution comprising a titanyl phthalocyanine pigment having high sensitivity to visible light of 600 nm or more dispersed in polyvinyl butyral with butanol as a solvent was applied as a spin coating 200 nm thick onto a glass substrate 0.7 mm thick with an ITO transparent electrode sputtered (7059: Corning Incorporated) and a solution comprising N,N'-bis (3-methylphenyl)-1,1'-biphenyl-4,4'-diamine dispersed in bisphenol Z polycarbonate with monochlorobenzene as a solvent was applied as a spin coating 3 µm thick onto the substrate, thereby forming a photoconductive layer. Next, a water solution comprising dye having high absorption of visible light of 600 nm or more (CF Cyan123: Manufactured by Mitsui Chemicals, Inc) dispersed in polyvinyl alcohol was applied as a spin coating 1 µm thick, thereby forming a light absorption layer. Next, the substrate was superposed on a glass substrate 0.7 mm thick with an ITO transparent electrode sputtered (7059: Corning Incorporated) via a 5-µm spherical spacer (Micropearl SP-205: Manufactured by Sekisui Chemical Co., Ltd.), providing an empty cell. A mixture solution of chiral nematic liquid crystal (E48, CB15, R1011: Manufactured by Merck KGaA) with the helical pitch adjusted so that the reflection peak wavelength becomes 630 nm and ultraviolet cure resin (NOA65: Manufactured by Norland) was capillary-poured into the gap of the empty cell in a heat state to isotropic phase and 50-mW UV light was applied for 30 seconds for forming an light modulation layer of a PSCT structure, thereby providing a second optical address type light modulation layer.

Last, the first optical address type light modulation layer was bonded to the top of the second optical address type light modulation layer with an acrylic resin, providing an optical address type spatial light modulator comprising the two optical address type light modulation layers stacked on each other.

A power unit controlled by arbitrary waveform generator was connected to the electrode of each of the two stacked optical address type light modulation layers and while write light was applied from the side of the second optical address type light modulation layer, a DC pulse voltage was applied and reflected light relative to outside light was observed. When white write light was applied, both the two optical address type light modulation layers became the reflection state and white read light was observed. When bluish green write light was applied, only the first optical address type light modulation layer became the reflection state and bluish green read light was observed. When red write light was applied, only the second optical address type light modulation layer became the reflection state and red read light was observed. When no write light was applied, both the two optical address type light modulation layers became the light absorption state and no read light was observed.

As described above, the optical address type spatial light modulator of the invention makes it possible to change the wavelength distribution of read light as an optical modulator of a simple integral structure wherein a plurality of optical address type light modulation layers are stacked on each other, and can also be applied as a display element.

What is claimed is:

1. An optical address type spatial light modulator comprising a plurality of optical address type light modulation layers stacked on each other, wherein each of optical address type light modulation layers comprises:

a liquid crystal layer for absorbing visible light in a specific wavelength band to color; and a photoconductive layer for absorbing the visible light in the specific wavelength band to change a resistance value in response to the light intensity of the visible light absorbed, wherein each of the liquid crystal layers and each of the photoconductive layers are stacked on each other, wherein the specific wavelength bands of the optical address type light modulation layers are different from each other, wherein write light carrying an image is incident on a surface side to write the image, and wherein read light for image read is incident on the surface side.

2. The optical address type spatial light modulator according to claim 1, wherein each of the liquid crystal layers transmits visible light in a wavelength band except the corresponding specific wavelength band.

3. The optical address type spatial light modulator according to claim 1, wherein each of the plurality of optical address type light modulation layers has electrodes on both sides thereof.

4. An optical address type spatial light modulator comprising a plurality of optical address type light modulation layers stacked on each other, wherein each of the optical address type light modulation layers comprises:

a liquid crystal layer for absorbing visible light in a corresponding specific wavelength band to color;

a photoconductive layer for absorbing the visible light in the corresponding specific wavelength band to change a resistance value in response to the light intensity of the visible light absorbed; and ps a light reflection layer disposed between the liquid crystal layer and the photoconductive layer, wherein each of the light reflection layers reflects the visible light substantially only in the corresponding specific wavelength band; and wherein each of the light reflection layers transmits visible light in a wavelength band except the corresponding specific wavelength band.

5. The optical address type spatial light modulator according to claim 4, wherein write light carrying an image is incident on a back side to write the image;

wherein read light for image read is incident on a surface side to read the image on the surface side;

wherein when one photoconductive layer is disposed so that at least one other photoconductive layer is disposed on the surface side than the one photoconductive layer, the one photoconductive layer absorbs the write light in the specific wavelength band, which is different from the specific wavelength bands of the at least one other photoconductive layer; and wherein when one optical address type light modulation layer to which the one photoconductive layer belongs is disposed so that at least one other optical address type light modulation layer is disposed on the back surface side than the one optical address type light modulation layer, the one photoconductive layer absorbs read light in the specific wavelength band, which is different from the specific wavelength bands of the at least one other photoconductive layer belonging to the at least one other optical address type light modulation layer.

* * * * *